Sept. 24, 1935.  A. C. CAIATI  2,015,513
ILLUMINATED AUTO LICENSE PLATE
Filed Dec. 8, 1934  2 Sheets-Sheet 1
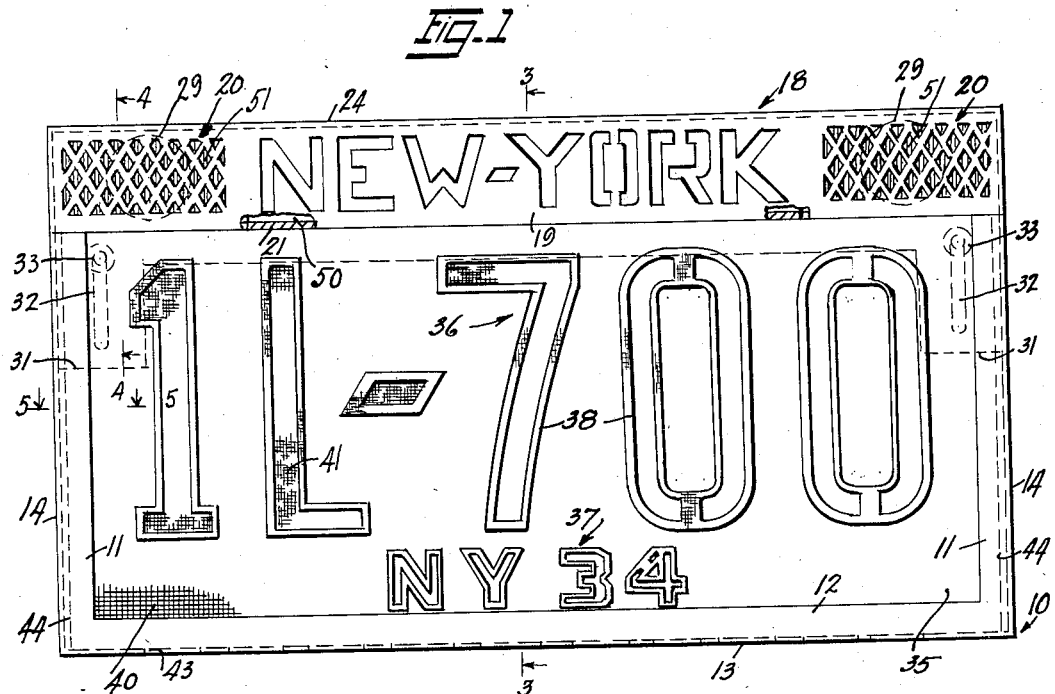
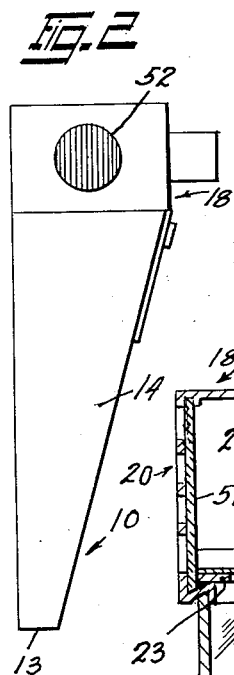
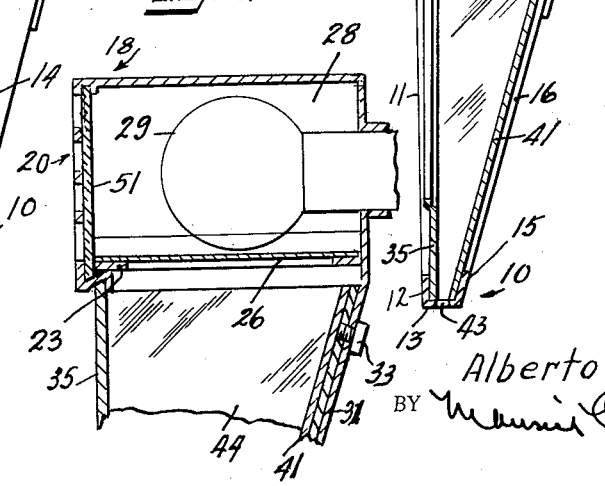
INVENTOR.
Alberto C. Caiati.
BY
ATTORNEY.

Sept. 24, 1935.  A. C. CAIATI  2,015,513
ILLUMINATED AUTO LICENSE PLATE
Filed Dec. 8, 1934  2 Sheets-Sheet 2
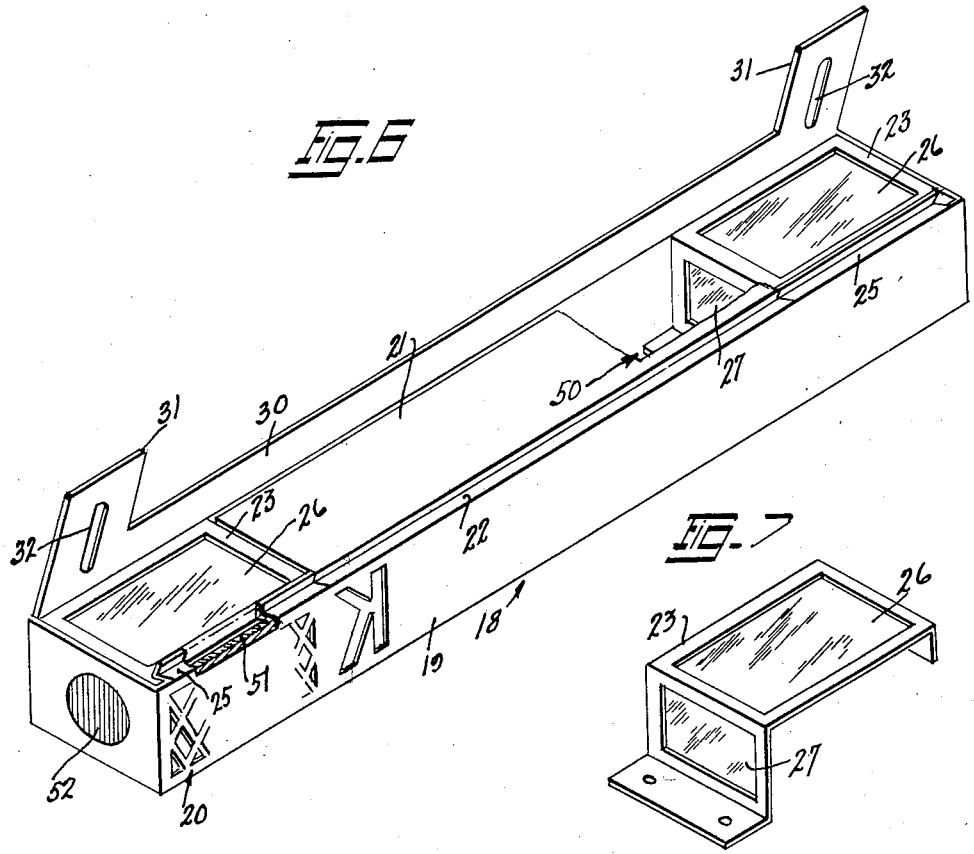
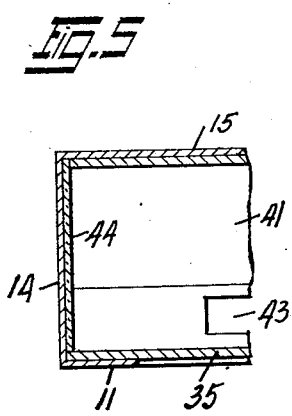
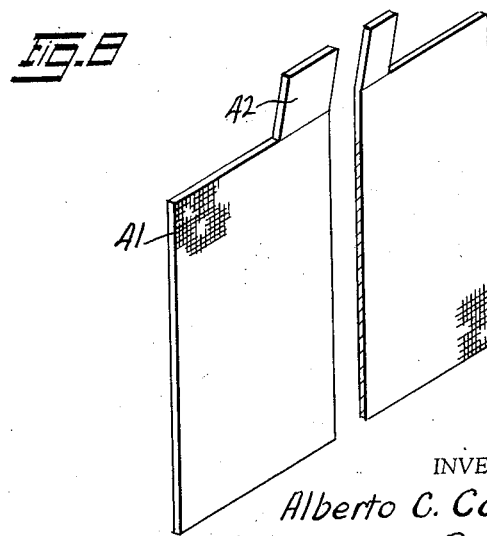
INVENTOR.
Alberto C. Caiati
BY
ATTORNEY.

Patented Sept. 24, 1935

2,015,513

UNITED STATES PATENT OFFICE 2,015,513

ILLUMINATED AUTO LICENSE PLATE

Alberto C. Caiati, Brooklyn, N. Y.

Application December 8, 1934, Serial No. 756,624

4 Claims. (Cl. 40—133)

This invention relates to automobile license plates, and signs and to the method of displaying and illuminating same.

One object of the invention is the provision of a license plate or tag in which the numerals are cut out and provided with an embossed and colored border or margin which numerals may be so illuminated that they are visible from a very long distance at night.

Another object of the invention is the provision of a stencil license plate and holder therefor in which the use of colored transparent backings are eliminated, thus preventing any accumulation of dirt and mud upon the said backing and consequent obliteration of the numerals.

A further object of the invention is the provision of a method of sign illumination which consists in the natural reflection of light and color through an open stencil which emits a free, bright light that is visible at a very long distance.

A still further object of the invention is the provision of a combined danger signal or rear light and automobile license plate, both illuminated by the same source of light.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1 is a front view of my improved license plate and holder.

Figure 2 is an end view thereof looking from the right of Figure 1.

Figure 3 is a sectional view taken on line 3—3, Figure 1.

Figure 4 is a fragmental sectional view at an enlarged scale, taken on line 4—4, Figure 1.

Figure 5 is a fragmental horizontal sectional view taken on line 5—5, Figure 1 at an enlarged scale.

Figure 6 is an inverted perspective view of the combined state indicating, danger signal and light housing, with parts thereof broken away for the sake of clarity.

Figure 7 is a perspective view of one of the light chamber closure members, and

Figure 8 is a perspective view partly broken away of the color reflecting plate.

Referring now to the drawings in detail 10 indicates a lower casing preferably made of thin sheet metal, and provided with front side flanges 11, a lower flange 12, a bottom wall 13, end walls 14 and a rear wall 15 which may be provided with a central cutout section 16 for the sake of lightness.

Secured to the rear wall of the casing 10 is an upper casing or housing 18. In the present instance, I have shown the center of the front wall 19 thereof with the name of the State of New York stenciled therein, and provided with lattice work end sections 20. From the said central portion of the front wall 19 there extends a bottom wall 21 to close the bottom of the central portion of the upper housing 18. The front of the said wall 21 is provided with a groove or bead 22, the object of which will presently be described. The bottom of the latticed end portions of the housing are closed by means of closure members 23 which may be secured to top wall 24. Grooved or beaded portions 25 similar to the central beaded portion 22 are bent from the front wall 19 at the ends thereof and are in alinement with the center bead 22. Each of the end closure members are provided with transparent panes or strips 26 and 27. In each of the chambers 28 formed by the closure members 23 there is suitably mounted an electric bulb or lamp 29 connected to a source of electric supply not shown. The rear wall 30 of the upper housing 18 is provided with a pair of lugs 31 having slots 32 through which pass screws 33 for securing the said upper housing to the rear wall of the casing 10.

A license plate 35 rests at the bottom thereof on the bottom wall 13 and of the lower casing 10 and is normally supported in the grooved sections 22 and 25. The said plate has cut therein large numerals 36 indicating the license number and smaller numerals and letters 37 indicating the year of the license and State issuing the same. Each of the numerals is provided with an embossed border 38.

As will be seen by referring to Figure 1 the license plate shown is of the type issued by the State of New York for the year 1934. As the coloring of the New York State plates are yellow numerals upon a black background, while I have shown the plate 35 as having a black background 40 and have shown the embossed borders 38 as being colored yellow, I do not restrict myself to these colors as any combination of colors may be used. To further bring out the color of the numerals, I have provided an inner plate 41 which rests against the rear inclined wall 15 of the lower casing 10 and which is colored yellow on one surface of the widest portion thereof. The upper or reduced portion 42 extends into the upper housing and may be of the same color as the front of the license plate, or it may be of the same color as the numerals and the lower portion may be of the same color as the front of the license plate. In the present instance, I may paint same white to clearly show the State indicia. The bottom wall of the casing 10 is provided with slots or openings 43 to prevent the accumulation of dirt and water in the said casing. A reflector 44 is provided at each end wall 14.

It will be understood that at night when the electric lamps 29 are lit, the light therefrom passing through the transparent panes 26 will illuminate the surface of the inner plate 41 and a clear yellow colored light will be reflected through stenciled numerals. The said lighting effect is enhanced by the mirrors or reflectors 44, thus producing a marked contrast between the numerals and surface of the plate which is visible at a great distance in the dark. It will also be understood that due to the fact that the colored plate 41 is spaced from the slotted numerals, the effect of depth will be given them.

Likewise, the light from the lamps 29 passing through the transparent strips 27 will light up the interior of the central compartment 50 and reflect the color of the projection 42 through the cut-out State indicating letters. Light will also be reflected through red colored transparent or translucent plates 51 forming danger signals at the ends of the housing 18. Further danger signals 52 visible from the sides of the upper casing will be illuminated by the lamps 29. The lattice work 20 will tend to break up the glare of the red light coming through the plates 51.

The device may be easily assembled or disassembled for the replacement of parts such as for instance the license plate, as by loosening the screws 33 the upper and lower casings may be slid apart and the plate withdrawn, and a new plate inserted, after which the two casings may be slid together and fastened by the screws 33.

I desire it understood that instead of coloring the surface of the plate 41 and the surface of the extension 42, they may be white and the transparent panes or strips 26 and 27 may be suitably colored to reflect the desired color upon the said surfaces. The wall 21 is especially provided in cases where the plate is white and the panes 26 and 27 are colored. Where the plate 41 and its projection 42 are of the complementary colors of the license plate, the wall 21 may be omitted. The entire device may be secured to the rear of an automobile by any suitable means not shown. By my improvement, I provide an illuminated license plate which will at all times provide a marked contrast between the color of the number-plate and that of the numerals or letters thereon.

From the foregoing, it will be seen that I have provided a combined license plate, holder and danger signal, all illuminated from the same source of light, and one in which the license number, year and State issuing same will be clear and visible from a great distance when so illuminated.

Having described my invention, what I claim as new and desire to secure by Letters Patent is:

1. A sign comprising a casing, a vertically disposed front colored plate having embossed indicia thereon, the said indicia having portions thereof cut out to provide a stenciled outline of the characters within the embossing, a rear wall on the said casing, a rear colored plate supported on the said wall and spaced from the front plate, an upper housing, indicia centrally located on the front wall thereof, a colored extension on the second plate extending into the upper housing, a compartment forming closure member at each end of the upper housing, transparent panes at the bottom and inner sides of the said closure members and lighting means in each of the compartments for the purpose specified.

2. A sign comprising a casing, a vertically disposed front colored plate having embossed indicia thereon, the said indicia having portions thereof cut out to provide a stenciled outline of the characters within the colored embossing, an inclined rear wall on the said casing, a rear white plate supported on the said inclined wall and spaced from the front plate, an upper housing secured to the casing, indicia centrally located on the front wall thereof, a wall forming a closure between the center of the upper housing and lower casing, a compartment at each end of the upper housing, an upper portion on the rear plate, extending into the upper housing, the color of the upper portion being the same as the lower portion transparent colored panes at the bottom and inner sides of the said compartments, lighting means in each of the compartments for the purpose specified, and a reflector at each end of the lower casing for enhancing the light effect in the lower casing.

3. A sign comprising a lower casing, a vertically disposed front colored plate having embossed indicia thereon, the indicia and the plate being of contrasting colors, the said indicia having portions thereof cut out to provide a stenciled outline of the characters within the colored embossing, an inclined rear wall on the said casing, a rear colored plate supported on the said inclined wall and spaced from the front plate, an upper housing, indicia centrally located on the front wall thereof, an extension on the second plate extending into the upper housing and spaced rearwardly from the last mentioned indicia, a compartment forming closure member at each end of the upper housing, transparent panes at the bottom and inner sides of the said closure members, lighting means in each of the compartments for the purpose specified, and a transparent colored pane at the front of the end compartments of the upper housing.

4. A sign comprising a casing, a vertically disposed front plate having embossed indicia thereon, the said indicia having portions thereof cut out to provide a stenciled outline of the characters within the embossing, an inclined rear wall in the casing, an upper housing on the casing, indicia on the front wall of the housing, a colored plate resting on the rear wall and spaced from the front plate and extending from the casing into the upper housing, the color of the lower portion of the plate being of a different color than the upper portion of the plate, and a source of light within the sign for simultaneously lighting up both the upper and lower portions of the rear plate.

ALBERTO C. CAIATI.